United States Patent [19]

Merkel

[11] 4,390,863
[45] Jun. 28, 1983

[54] SYSTEM FOR THE TRANSMISSION OF BINARY SIGNALS BETWEEN THE COMPONENTS OF AN ALARM SYSTEM

[75] Inventor: Willi Merkel, Albstadt, Fed. Rep. of Germany

[73] Assignee: Fritz Fuss Kom.-Ges Elektrotechnische Fabrik, Albstadt, Fed. Rep. of Germany

[21] Appl. No.: 158,880

[22] Filed: Jun. 12, 1980

[30] Foreign Application Priority Data

Jun. 12, 1979 [DE] Fed. Rep. of Germany ....... 2923715

[51] Int. Cl.³ ............................................. H04B 3/54
[52] U.S. Cl. ........................ 340/310 R; 340/825.58; 340/825.76; 340/538
[58] Field of Search .................. 340/538, 539, 310 R, 340/310 A, 310 CP, 151, 152 R, 870.01, 825.73, 825.76, 825.58, 825.26; 455/68, 42; 375/45

[56] References Cited

U.S. PATENT DOCUMENTS

| | | | |
|---|---|---|---|
| 2,799,853 | 7/1957 | Colwell et al. | 340/310 CP |
| 2,913,711 | 11/1959 | Polyzou et al. | 340/310 R |
| 3,622,999 | 11/1971 | Getz et al. | 340/825.58 |
| 3,810,096 | 5/1974 | Kabat et al. | 340/310 CP |
| 3,815,119 | 6/1974 | Finlay et al. | 340/310 R |
| 3,835,394 | 9/1974 | Stolt et al. | 340/825.58 |
| 3,903,508 | 9/1975 | Taketa | 340/310 R |
| 3,911,415 | 10/1975 | Whyte | 340/310 A |
| 3,986,121 | 10/1976 | Oehrli | 340/310 A |
| 4,016,429 | 4/1977 | Vercellotti et al. | 340/310 A |
| 4,040,046 | 8/1977 | Long et al. | 340/310 A |
| 4,194,153 | 3/1980 | Masaki et al. | 340/311 |

Primary Examiner—James J. Groody
Attorney, Agent, or Firm—Fleit, Jacobson & Cohn

[57] ABSTRACT

A system for transmission of binary signals between components of an alarm installation and across a transmission path, including an external wire network, comprises a converter for converting each of two logical conditions of two binary signals into respective signal frequencies, a coupler for coupling the alarm installation to the external wire network, a clamping circuit for clamping both binary signals to the same amplitude, providing the binary signals representing the two logical conditions with respective signal frequencies within a given range of frequencies and with a given frequency separation, and a band pass filter circuit at the receiving end of the transmission path for detecting the information signals, and exhibiting a narrow band pass responsive characteristic which is symmetrical with respect to the mean frequency of the two binary signals. Components of the system include a modulator, transmitting point, coupler, band pass filter, demodulator, and associated amplifiers.

7 Claims, 2 Drawing Figures

SYSTEM FOR THE TRANSMISSION OF BINARY SIGNALS BETWEEN THE COMPONENTS OF AN ALARM SYSTEM

BACKGROUND OF THE INVENTION

Electronic alarm systems for homes and offices often consist of several separate components which have a working relationship with each other. Thus signal devices assigned to different locations can send a signal to a central switching device which then can activitate one or several alarm devices.

In present systems of this sort the working relationship of such components is carried out through the general electrical wiring system so that the laying of special cables is unnecessary. With the increasing number and distance of the areas that must be guarded, this is an essential advantage.

In such alarm systems, the components that must be brought into a working relationship with each other are simply connected into the outlet at their place of location, through which they send out or from which they receive special signals.

These signals could be, for example, sound frequencies or impulses, which are transmitted to the wiring of a suitable coupling device. Naturally the outlet can also be used as an energy source so that it can always replenish an accumulator joined to the special component so that the system remains functioning even when the electricity is shut off.

In present systems, binary coded signals, i.e. pulse trains, are transmitted so that for example the alarm signal from a certain signal device can be identified. In this case, a certain frequency is assigned to one of the two logical conditions, usually "1", whereas the absence of this frequency represents the logical condition "0".

Practical experience with such systems shows that the desired reliability of signal transmission is especially not achieved if the binary signals are transmitted through a wiring system with high interference. Such interference can for example be caused by motors, phase gate power controls, fluorescent lamps, etc. and are always present on usual electric supply wiring systems.

SUMMARY OF INVENTION

The purpose of this invention is to create a system for the transmission of binary signals between the components of an alarm installation over an external wiring system which provides reliable data exchange between the components at a relatively high speed in spite of strong interference from the wiring system.

As a solution to this problem the invention is so conceived that both logical conditions of binary signals are converted to a specific frequency allocated to them, both frequencies are linked to the external wiring at a level of the same magnitude and these are selected on the receiving end by a band filter common to both.

The conversion of both logical conditions into a definite frequency specific for them has the further advantage that the second condition is also ascertainable through the perception of a concrete signal and is not simply given as an absence of signalling. A special advantage arises if both spot frequencies lie in close range with each other and are seletable through a common band filter since then the rise time during the signal traffic does not impair the speed of transmission.

Further details of the invention are discussed based on a preferred set-up with reference to the attached diagrams.

DETAILED DESCRIPTION

Figure 1:
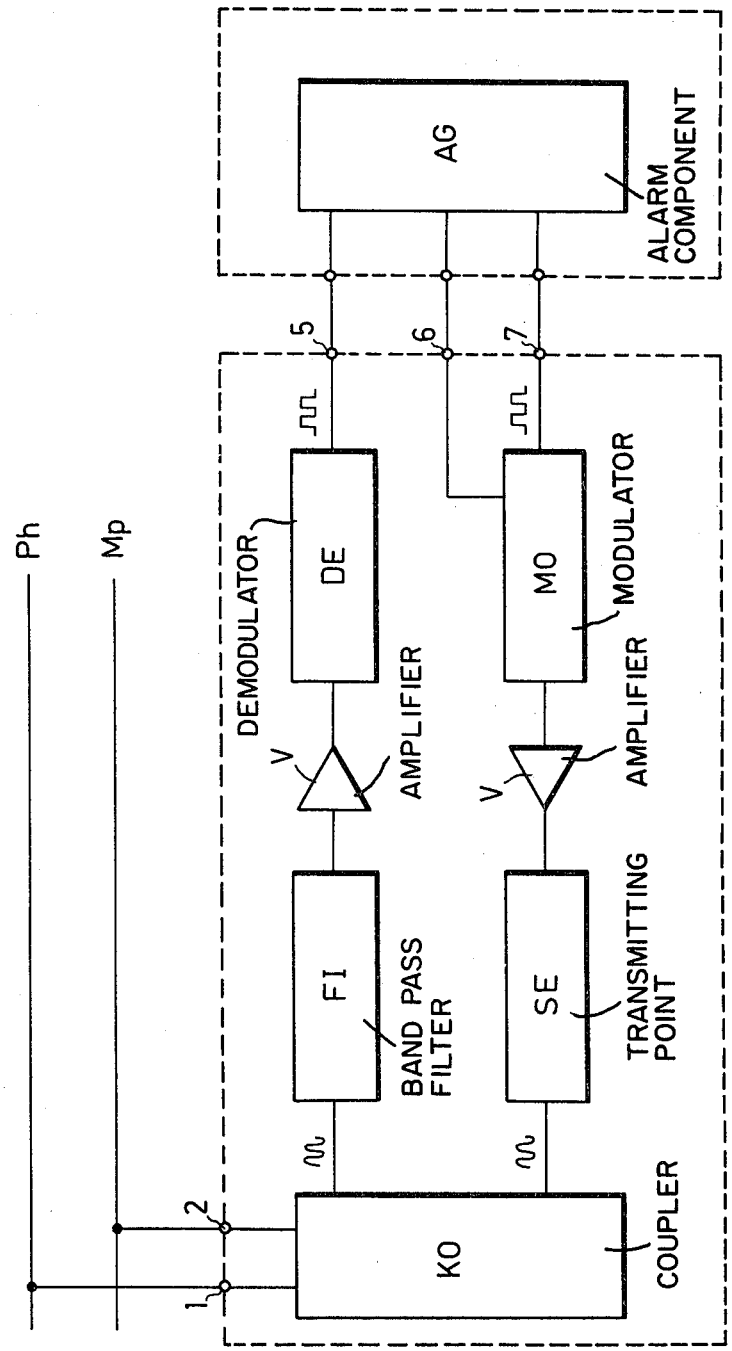
FIG. 1 shows a block schematic of a system for which the invention is applicable.

With reference to FIG. 1, an alarm component AG can produce a binary signal in the form of a pulse train through the connecting terminal 7 to a modulator MO.

The modulator MO is a lobe-switchable frequency generator which upon the reception of the logical "0" sends a first frequency f1 and upon reception of a logical "1" sends a second frequency f2 to an amplifier V. Each frequency is given through a transmitting point SE to a coupler KO which links that frequency through condensers or other suitable devices to phase Ph, for example, or the neutral wire Mp of the electrical wiring system.

When the alarm component AG sends no signals, the control is in a state of receptivity. If signals sent by another alarm component in the form of frequencies f1 and f2 arrive at the coupler KO, then they can pass through band pass filter FI and can arrive, as intensified or amplified by the amplifier V, at demodulator DE. If the demodulator DE receives the frequency f1 at its input, it produces at its output the logical "0" and on receiving the frequency f2, the logical "1". Through connectings terminal 5 the demodulated signals arrive at the alarm compoment AG where they are evaluated by a logical switching device.

Figure 2:
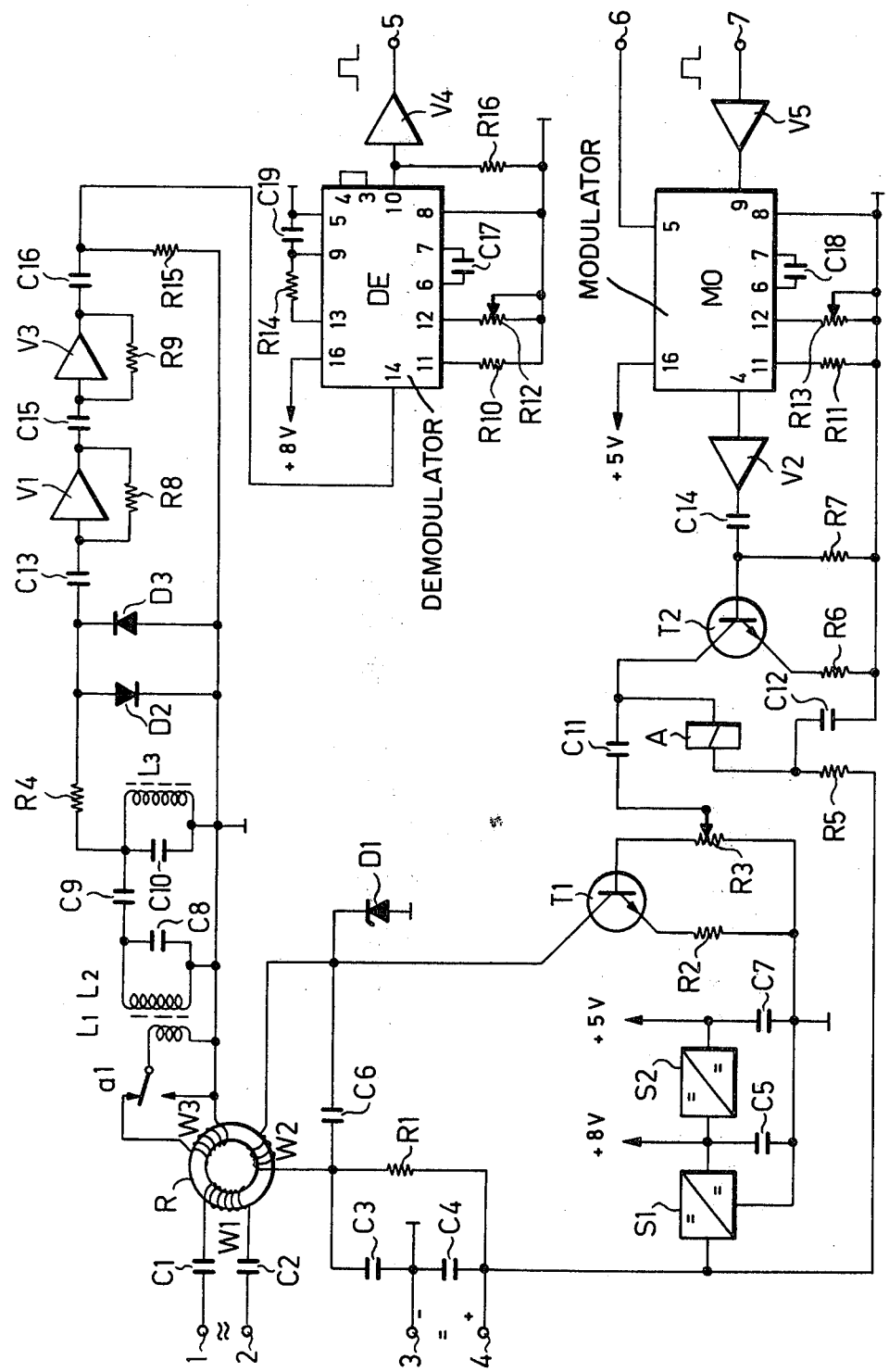
FIG. 2 shows a detailed eletrical wiring plan for a preferred installation of the system suitable to the invention.

As shown in FIG. 2 which is a detailed representation of a preferred installation of the invention, the binary signal of the alarm component, which is not shown here, arrives in the form of a pulse train through connecting terminal 7 at the amplifier V5. The intensified signal is conducted to a modulator MO, which on receiving the logical "0" produces an initial frequency f1 of 277.25 kHz and passes it on to an amplifier V2. On receiving the logical "1" the modulator MO produces a second frequency f2 of 282.75 kHz which is likewise passed on to the amplifier V2.

The modulator is preferably a semiconductor module of the phase-locked-loop group common to the trade, whose construction and mode of operation are known and for example has been described in "Elektronik Entwicklung", Nr. 10 (1978), pages 475 through 479. In the case of the installation described herein the type CD 4046 shown in the magazine has been used.

The module receives the binary pulse trains at its connection plug 9 and, depending on the logical signal received, produces at terminal 4 either the first frequency f1 or the second frequency f2. At terminal 16 a positive electric supply tension of +5 V is connected, while terminal 8 is grounded for the reception of negative electrical supply tension. Terminal 11 is grounded through an invariable resistance and terminal 12 is grounded through a variable resistance R13. Terminal 6 and 7 are connected to each other across a small condenser C18 whose capacity falls within the pF-range and which, along with R11, determines the working frequencies of the modulator. At terminal 5 the modulator MO receives the logical steady signal "0" or "1", whereby it is either activated or blocked.

The frequency signal of the modulator MO arrives through the amplifier V2 and the coupling condenser C14 at the base of a transistor T2, which is activated as a driver and receives its commutator current through relay A. A switching contact $a1$ is needed by the receiving circuit which will be shown later.

The particular frequency arrives through condenser C11 and the tap of the variable resistance R3 at the base of a transistor T1 which functions as the transmission point. The commutator of the transistor T1 receives its power from the winding w2 of a magnetic toroidal core R and a resistor R1. A condenser C6 is placed across the winding w2 of the toroidal core R which serves the purpose of modulating the toroidal core. A break-down diode D1 is provided for the protection of the transistor T1 and cuts off any voltage peaks arriving from the outside across winding w2.

Both ends of another winding w1 of the toroidal core are joined to the connecting terminals 1 and 2 across the condensers C1 or C2 of the same power range, which are connected by a cable that is not shown to the general electric supply at a wall outlet.

At two other connecting terminals 3 and 4 a direct current of 12 V is connected, which is produced by a battery accumulator (not shown), which is also buffered by a power-supply unit (also not shown). Across two tandem stabilizing circuits S1 and S2 stabilized supply currents of +8 V and +5 V are produced for the supply of the individual subassemblies. These currents serve also to supply the various amplifiers which, due to their simplicity, are not shown in the diagram.

On the other hand, should a signal of an alien alarm component arrive through the condensers C1 and C2 at the winding w1, this is induced into another winding w3 of the toridal core, which is assigned to the receiver. If the transmitter is inactive, relay A allows contact $a1$ to assume its upper position, and the reception signal induced in the winding w3 is conducted through the switching contact $a1$ of the relay A of the attaching coil L1 of the band pass filter. The band pass filter F1 (FIG. 1) consists of a first resonant circuit which is formed from coil L2 and condenser C8 (FIG. 2) and a second resonant circuit which is formed from coil 13 and condenser C10. The first resonant circuit is coupled to the second resonant circuit across condenser D9. The two-circuit band pass filter is preferably tuned in such a way that, in relative to a band mean frequency of 280 kHz, it exhibits a symmetrical response curve, which provides the same transmission conditions for the frequencies f1 and f2, which lie at a variance of + or −2.75 kHz, respectively, to the band mean frequency.

At the arrival of an external signal group, the band pass filter receives constantly one of the two frequencies f1 or f2 but no signal pauses. Since the filter thus receives alternatively only two extremely similar frequencies, the onset processes typical to filters are practically eliminated wherefore the filter can follow a rapid signal exchange. For this reason, it is advantageous that, before sending a signal group, the frequency f1 designating the logical "0" be sent, so that the filter is already in a steady state condition at the arrival of the pulse-returning wave trains. For the same reason, it is advantageous to transmit the frequencies f1 and f2 at the same level.

From the output side of the filter, the selected frequency signal passes through a resistor R4 to two opposing diodes D2 and D3, which act as limiters and limit the amplitude of possible interference peaks. Through a coupling condenser C13, this received signal is conducted over a feed-back amplifier V1 and then through a condenser C15 to a feed-back amplifier V3. The output signal of the amplifier V3 passes, via condenser C16, to a terminal resistance R15 provided for impedance matching, and to the input terminal 14 of the demodulator DE.

The demodulator DE is also preferably a semiconductor module for which the type CD 4046 A can be used which has already been installed as the modulator within the transmitter. When the demodulator receives the frequency f1, it produces at its output the logical "0" and when it receives the frequency f2, it produces at its output the logical "1".

The demodulator module receives the frequency signal at terminal 14 and sends out the corresponding logic signal at terminal 10. At terminal 16 the supply current of +8 V is provided and terminal 8 is grounded. Terminal 11 is grounded across a fixed resistor R10 and terminal 12 is grounded across an adjustable resistor R12. Also in this instance terminals 6 and 7 are connected with each other across a condenser C17 whose capacity lies in the pF range. Terminal 5 which functions as the start-stop input is grounded so that the demodulator DE is always in a ready state. Between terminals 9 and 13, a resistor R14 is provided, and terminal 9 is additionally grounded through a condenser C19. Terminals 3 and 4 are joined by a bridge.

The output of the demodulator DE is connected with the input of an amplifier V4 and grounded across a resistor R16. The output of the amplifier V4 is joined to the connecting terminal 5 which produces the reception signal for the subsequently switched on alarm component.

As tests have shown, the system described herein, in spite of a transmission wiring system with high interference, has permitted good communication between the various components of an alarm system to locations at a distance of several hundred meters. Especially good results have been achieved at a timing sequence frequency of the binary signals in the range of 50 Hz and 5 kHz, and at transmission frequencies between 20 kHz and 500 kHz.

I claim:

1. A system for the transmission of binary signals having two logical conditions between the components of an alarm installation and across a transmission path including an external wire network, comprising:
   converting means for converting each of the two logical conditions of said binary signals into respective signal frequencies,
   coupling means for coupling the alarm installation to the external wire network,
   clamping means for clamping the voltage level of both binary signals on the same amplitude, and providing the binary signals representing the two logical conditions with respective signal frequencies within the range of between 20 kHz and 500 kHz, said frequencies being separated from each other by less than 10 kHz, and
   band pass filter means for detecting the respective signals frequencies said filter means comprising two linked parallel resonant circuits, one of said two linked parallel circuits being tuned to a first one of the two respective frequencies and another of said two linked parallel circuits being tuned to a second one of the respective frequencies, said band pass filter exhibiting a narrow band pass response characteristic which is symmetrical with respect to a band mean frequency of the two binary signals, and wherein the coupling means comprises a ferrite ring with three windings, including a first winding connected via two condensors with the external wire network, a second winding connected to the converting means, and a third winding connected to the band pass filter means.

2. The system of claim 1, wherein the band means frequency is set at 200 kHz, and wherein the band pass filter means has limit frequencies which are set off by one of approximately +3 kHz and approximately −3 kHz.

3. The system of claim 1, wherein, before the transmission of a pulse train, at least for the duration of a pulse width, a signal corresponding to logical "0" is sent.

4. The system of claim 1, wherein the binary signals have a timing sequence frequency which lies within a range of 50 Hz to 5 kHz.

5. The system of claim 1, wherein said converting means comprises a modulator for receiving and modulating the binary signals to produce output signals having said respective signal frequencies corresponding to the two logical conditions of said binary signals.

6. The system of claim 1, wherein said band pass filter means comprises at least one resonant circuit.

7. The system of claim 6, wherein said band pass filter means further comprises a demodulator connected to said at least one resonant circuit, said at least one resonant circuit being responsive to the respective signal frequencies for producing filtered output signals having filtered output signal frequencies corresponding to said respective signal frequencies of said converting means, said demodulator demodulating said filtered output signal frequencies to produce logical output signals corresponding to said two logical conditions of said binary signals.

* * * * *